United States Patent [19]

Imazeki et al.

[11] 4,420,716
[45] Dec. 13, 1983

[54] DC MOTOR CONTROL APPARATUS

[75] Inventors: Kazuyoshi Imazeki; Masao Nakano, both of Tokyo, Japan

[73] Assignee: General Research of Electronics, Inc., Tokyo, Japan

[21] Appl. No.: 219,314

[22] Filed: Dec. 22, 1980

[30] Foreign Application Priority Data

Dec. 29, 1979 [JP] Japan .................... 54-173098

[51] Int. Cl.³ .................... H02P 3/14
[52] U.S. Cl. .................... 318/379; 318/258; 318/342; 318/345 B; 318/375
[58] Field of Search .......... 318/339, 341, 342, 345 E, 318/345 B, 362, 375, 379, 256, 258, 280, 291, 293, 299, DIG. 1

[56] References Cited

U.S. PATENT DOCUMENTS

| | | | |
|---|---|---|---|
| 3,737,751 | 6/1973 | Lima | 318/375 X |
| 3,811,081 | 5/1974 | Abbadessa | 318/375 |
| 3,887,856 | 6/1975 | Cicchiello | 318/345 B |
| 4,104,571 | 8/1978 | Gurwicz et al. | 318/375 X |
| 4,319,170 | 3/1982 | Brent | 318/258 X |
| 4,319,171 | 3/1982 | Motoori | 318/379 |

OTHER PUBLICATIONS

"Motor Control Using Logic Circuits," by G. Gimber, Electronic & Applications Industry (France), No. 234 (Apr. 1, 1977).

Primary Examiner—J. V. Truhe
Assistant Examiner—Richard M. Moose
Attorney, Agent, or Firm—Trexler, Bushnell & Wolters, Ltd.

[57] ABSTRACT

A DC motor control apparatus is disclosed comprising a first pair of switching elements coupled respectively with oppositely poled ends of the DC motor. A first actuating means is provided for actuating one of a first pair of switching elements in response to an input signal of a first predetermined logic content. The other of the first pair of switching elements is provided to respond to an input signal of a second predetermined logic content. Also provided, are means for applying a driving potential to the oppositely poled end of a motor simultaneously with the actuation of each of the first pair of switching elements, thereby establishing a current path for forward direction and reverse direction operation of said DC motor, respectively. A second pair of switching elements are respectively connected to oppositely poled ends of the DC motor. Second actuating means are provided for simultaneously actuating both of the second pair of switching elements and both of the first pair of switching elements in response to an input signal of a third predetermined logic content, thereby forming a current path for releasing an electromotive force of either polarity from the DC motor during braking.

9 Claims, 2 Drawing Figures

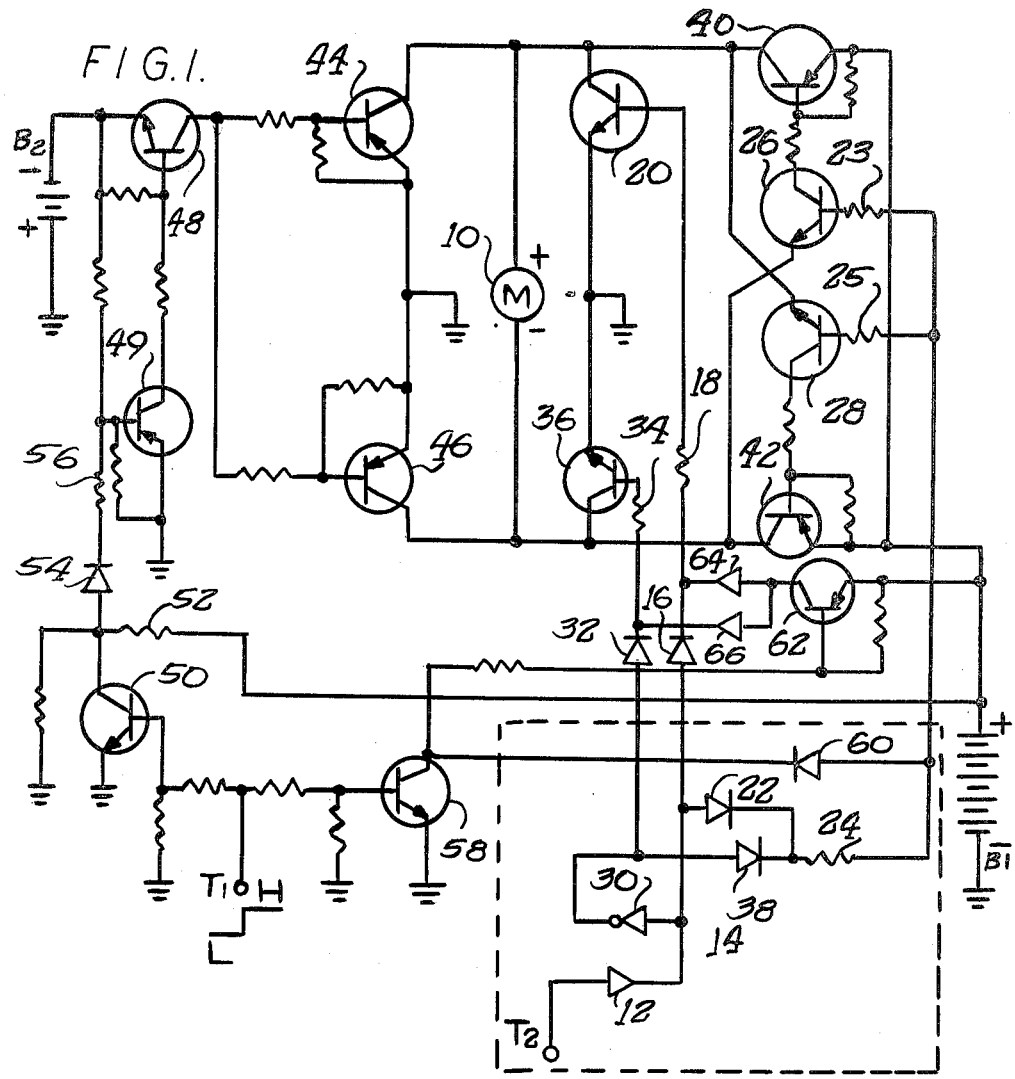

DC MOTOR CONTROL APPARATUS

BACKGROUND OF THE INVENTION

This invention relates to a motor control apparatus, and more particularly to a DC motor control apparatus for controlling the direction of rotation and dynamic braking of a DC motor in response to logic signals.

Such motor control in response to externally supplied digital logic signals enables use of an external control apparatus supplying such digital logic signals, for example, a computer for motor control.

OBJECTS AND SUMMARY OF THE INVENTION

Accordingly, it is a general object of this invention to provide a novel control apparatus for controlling the operation of a DC motor in response to digital logic signals.

A more specific object is to provide such a control apparatus wherein the digital logic signals required to carry out the control of a DC motor (forward direction drive instruction, reverse direction drive instruction, and stop instruction) are as few and simple as possible.

A related object is to provide such a control apparatus which minimizes the number of cables required for remote control of a DC motor.

A further object is to provide such a control apparatus which is relatively simple and inexpensive in its design and construction and yet highly reliable in operation.

Yet another object is to provide such a control apparatus which is so structured that it can readily be constructed as an integrated circuit component and is thereby conveniently small in size and low in price.

Briefly, and in accordance with the foregoing objects, a DC motor control apparatus according to the invention is capable of controlling both rotational direction and dynamic braking of said DC motor in response to as few as two binary logic input signals. This motor control apparatus comprises a plurality of switching elements coupled respectively with oppositely poled ends of the DC motor to be controlled. Actuating means are provided for actuating selected combinations of ones of said plurality of switching elements in response to input signals of different logic contents for establishing different current paths through said DC motor to achieve driving of said DC motor in a forward direction and in a reverse direction and for releasing an excitation current in either direction from said DC motor to achieve dynamic braking thereof.

BRIEF DESCRIPTION OF THE DRAWINGS

The features of this invention which achieve these and other objects will become more readily apparent from the following detailed description of the illustrated embodiments together with reference to the accompanying drawings, wherein:

FIG. 1 is a circuit schematic diagram of a first embodiment of a circuit according to the invention; and FIG. 2 is a schematic circuit diagram of a modification of a portion of the circuit of FIG. 1, to form a second embodiment of the invention.

DETAILED DESCRIPTION OF THE ILLUSTRATED EMBODIMENTS

Referring initially to FIG. 1, a circuit for controlling a DC motor 10 in response to externally supplied digital logic signals is illustrated. Advantageously, this circuit is arranged to provide full control over the operation of the motor 10 (i.e., forward direction rotation, reverse direction rotation and bidirectional dynamic braking) in response to but two digital logic signals, supplied at terminals $T_1$ and $T_2$. Moreover, these logic signals need only be simple, binary logic "0" and "1" or high (H) and low (L) levels.

In the embodiment illustrated in FIG. 1, the logic signal at the terminal $T_1$ initiates the control of dynamic braking when the logic level thereof changes from low level (L) to high level (H). If the logic level of this signal at terminal $T_1$ is L, then the motor 10 is free to run in accordance with the logic level of the signal applied to the terminal $T_2$. However, when the logic level at terminal $T_1$ is H, the motor 10 stops regardless of the logic level of the signal at the terminal $T_2$.

At the terminal $T_2$, a forward/reverse rotation direction instruction or control signal having logic levels L and H is applied. In the embodiment illustrated, in FIG. 1, if this control signal is L, the motor 10 is rotated in one direction (forward rotation), and, if it is H, in the other direction (reverse rotation).

This rotation direction instruction logic signal at the terminal $T_2$ is applied to a circuit point 14 through a buffer element 12. If this rotation direction instruction logic signal at $T_2$ is at the H level, that is, calling for reverse rotation, then a further logic signal at this H level is applied to the base of an NPN transistor 20 through a diode 16 and a resistor 18. This logic H is also applied to the base of each of a pair of NPN transistors 26 and 28 through a diode 22, a resistor 24 and respective series resistors 23 and 25.

When the rotation direction instruction logic signal of the terminal $T_2$ is at the L level, that is, a forward rotation instruction, a resulting H level signal at the output of an inverter 30 is applied to the base of an NPN transistor 36 through a diode 32 and a resistor 34. This logic H level is also applied to the bases of the transistors 26 and 28 through the same diode 38, resistor 24 and series resistors 23 and 25.

When the transistors 26 and 28 receive the H level signal at their bases, they respectively switch a pair of PNP transistors 40 and 42 to the "on" state. Consequently, the positive terminal of a first power supply or battery $B_1$ is effectively connected to the respective collectors of the two transistors 20 and 36.

Between the collectors of the transistors 20 and 36, the motor 10 and another pair of PNP transistors 44 and 46 are connected. More particularly, the positive terminal of the motor 10 is connected to the collectors of the transistors 20 and 44, and the negative terminal of the motor 10 is connected to the collectors of the transistors 36 and 46. The emitters of all these transistors 20, 36, 44 and 46 are grounded.

The transistors 44 and 46 are turned "on" by the action of two further transistors 48 (NPN) and 49 (PNP) and the negative terminal of a second power supply or battery $B_2$ when the logic signal of the terminal $T_1$ is at the H level, which level constitutes a stop or braking instruction. Conversely, when the terminal $T_1$ is at the L level, a transistor 50 (NPN) is off, so that the $B_1$ positive voltage is applied through a resistor 52, a diode 54 and a resistor 56 to hold the transistors 49 and 48 and hence the transistors 44 and 46 are turned off. However, when transistor 50 is turned on by the logic H level or braking instruction at the terminal $T_1$, the negative voltage from a second battery $B_2$ turns the transistors 49, 48 on and hence the transistors 44 and 46 are also turned on.

A transistor 58 (NPN) is turned on in the same manner as the transistor 50 when the braking instruction signal or H level is present at the terminal $T_1$. When turned on in this fashion, the transistor 58 grounds the base of each of the transistors 26 and 28 through the resistors 23, 25, a diode 60 and the collector-emitter junction of this transistor 58. Additionally, the "on" state of the transistor 58 turns on a transistor 62 (PNP) thereby applying the $B_1$ positive voltage to the base each of the transistors 20 and 36 through diodes 64 and 66 and resistors 18 and 34, respectively, to turn these two transistors on at the same time.

Table I shows the state, either "on" (O) or "off" (X), of each transistor of FIG. 1 in response to all possible combinations of binary logic signals at the termainals $T_1$ and $T_2$.

TABLE I

| $T_1$ | $T_2$ | 48 | 49 | 44 | 46 | 20 | 36 | 40 | 26 | 28 | 42 | 62 | 50 | 58 |
|---|---|---|---|---|---|---|---|---|---|---|---|---|---|---|
| L | L | X | X | X | X | O | O | O | O | X | X | X | X |
| L | H | X | X | X | O | X | X | O | O | O | X | X | X |
| H | * | O | O | O | O | O | X | X | X | X | O | O | O |

*= either state

In operation, then, and referring to Table I, when there is no braking instruction, that is, when the logic level at the terminal $T_1$ is L, and when the rotation instruction at the terminal $T_2$ is L, that is, a forward direction rotation instruction, then the $B_1$ positive voltage is applied through the transistor 40 which is in the "on" state to the positive terminal of the motor 10. Accordingly, the current flows from the positive pole to the negative pole of the motor 10 and further flows to ground through the transistor 36 which is also in the "on" or conductive state. Conversely, when a reverse direction rotation instruction or L level is applied to the terminal $T_2$ (terminal $T_1$ still at L level) the transistor 36 is turned off and the transistor 20 on, so that the current flows through the motor from the negative pole to the positive pole thereof, to achieve reverse direction rotation.

When a braking instruction or H level is present at the terminal $T_1$, the transistors 40 and 42 are turned off at the same time regardless of the rotation direction signal at the terminal $T_2$, while the four transistors 20, 36 44, 46 connected between both ends of the motor and ground are all turned on. During braking of the motor 10, an electromotive force of the opposite polarity from that during driving of the motor 10 is generated. That is to say, when braking from forward rotation, an electromotive force (emf) of the opposite polarity from the polarity of the motor 10 indicated in FIG. 1 is generated. The current resulting from this emf flows through a circuit which is formed by the transistors 36 and 44, the electric power thereof being effectively absorbed by this circuit. Similarly, when braking from reverse rotation, the other pair of transistors 20 and 46 form a similar circuit with the motor 10, whereby dynamic braking is accomplished.

From the foregoing, it will be seen that means are provided for applying a positive potential selectively to either end of the motor 10 in response to a corresponding rotation direction instruction and for simultaneously applying an opposite potential to the other end of the motor 10. In the illustrated embodiment, the positive potential is that of the battery $B_1$, and the negative potential is a ground level. The means for applying a positive potential is constructed to turn one of the transistors 20 and 36 off, and the means applying a negative potential is constructed to turn the other of the transistors 20, 36, on. Either end of the motor may be grounded through one of these two transistors 20, 36. When one end of the motor is thus grounded, an excitation voltage is applied to the other end.

Means are also provided for allowing dynamic braking by providing a short circuit, e.g., to ground, to both ends of the motor at the time of braking. This means includes both means for releasing the power excitation from the motor and means for providing a selective short circuit in response to the direction of the electromotive force of the motor. The latter means includes the pair of transistors 44 and 46 which, similarly to the above-mentioned pair of transistors 20 and 36 are connected between respective ends of the motor and ground, but are activated only at the time of braking. The braking electromotive force, depending upon the direction thereof, is dissipated through a short circuit which is formed by one of the first pair of transistors 20, 36 connected to one end of the motor and one of the second pair of transistors 44, 46 connected to the other end of the motor.

FIG. 2 shows an alternate embodiment of the portion of the circuit of FIG. 1 which is enclosed in dashed lines. This embodiment responds to a forward rotation instruction signal of H level applied to a terminal $T_4$ and to a reverse rotation instruction signal of H level applied to a terminal $T_5$. However, when the logic levels at the terminals $T_4$ and $T_5$ are the same, dynamic braking is initiated by the circuit of FIG. 2. For example, a braking signal is generated when, while the motor is being rotated in forward direction ($T_4$ at H, $T_5$ at L), either a reverse rotation instruction (logic level H) is input to the terminal $T_5$, or the logic level H at the terminal $T_4$ is inverted (to L).

The logic level at the terminal $T_4$ is applied to the transistor 36 through a buffer 102, the diode 32 and the resistor 34, and the logic level at the terminal $T_5$ is applied to the transistor 20 through a buffer 104, the diode 16 and the resistor 18. A gate circuit which consists of an exclusive-NOR gate 106, and AND gate 108 and an exclusive-OR gate 110 provides signals to a point 112, which is the same point as terminal $T_1$ of FIG. 1, of the logic levels shown in Table II. That is, a signal of L level is applied at point 112 when there is an instruction (H) at either of terminal $T_4$ or $T_5$ (but not the other). Conversely, when both terminals $T_4$ and $T_5$ are at the same level, either H or L, a signal of H level is applied to the point 112. Thus, the logic signal at the circuit point 112 performs the same function as the signal to the terminal $T_1$ of FIG. 1.

A further gate circuit which consists of an exclusive-OR gate 114 and an AND gate 116 generates a logic signal at a circuit point 118 of L level at the time of braking (terminals $T_4$ and $T_5$ both either at H or L) and a logic signal of H level at the time of forward or of reverse rotation (only one of $T_4$ and $T_5$ at H). This circuit point 118 feeds the resistor 24 of FIG. 1.

Table II draws the state, on (O) or off (X), of each transistor of FIG. 1, in response to the possible combinations of binary logic signals at terminals $T_4$ and $T_5$. The corresponding logic levels at circuit points 112 and 118 of FIG. 2 are also shown.

TABLE II

| T4 | T5 | 112 | 118 | 48 | 49 | 44 | 46 | 20 | 36 | 40 | 26 | 28 | 42 | 62 | 50 | 58 |
|---|---|---|---|---|---|---|---|---|---|---|---|---|---|---|---|---|
| H | L | L | H | X | X | X | X | X | O | O | O | O | X | X | X | X |
| L | H | L | H | X | X | X | X | O | X | X | O | O | O | X | X | X |
| L | L | H | L | O | O | O | O | O | O | X | X | X | X | O | O | O |
| H | H | H | L | O | O | O | O | O | O | X | X | X | X | O | O | O |

The circuit of FIG. 2 is an example of forming a stop or braking control signal under a specific logic condition (L and L or H and H) of two binary logic signals for forward and reverse rotation instructions by adding gate circuits. However, it is also possible to utilize other conditions or logics, without departing from the invention. For example, it is possible to form a stop or braking signal under the condition of only a no-instruction level (L, L) of the logic (H, H) for forward and reverse rotation.

While preferred embodiments have been illustrated and described herein, the invention is not limited thereto. On the contrary, various alternatives, modifications and changes may occur to those skilled in the art, and the present invention is intended to include such alternatives, modifications and changes insofar as they fall within the spirit and scope of the appended claims.

The invention is claimed as follows:

1. A DC motor control apparatus for controlling a DC motor, comprising: a first pair of switching elements coupled intermediate a ground potential and oppositely-poled ends of said DC motor respectively, a second pair of switching elements coupled intermediate a source of driving potential and oppositely-poled ends of said DC motor respectively, circuit means coupled with said first and second pairs of switching elements and responsive to respective first and second predetermined logic contents of a two-bit binary logic signal for respectively actuating a selected one of each of said first and second pairs of switching elements for extablishing a current path for forward direction and reverse direction operation of said DC motor, respectively, and a third pair of switching elements connected intermediate ground potential and said oppositely-poled ends of said DC motor respectively, said circuit means being further responsive to a third predetermined logic content of said two-bit binary logic signal for simultaneously actuating both of said first pair of switching elements and both of said third pair of switching elements to form a current path for releasing an electromotive force of either polarity from said DC motor during braking from rotation in either direction thereof.

2. A DC motor control apparatus according to claim 1 wherein said first pair of switching elements comprises a pair of directional switching elements, each being coupled between one end of said DC motor and ground, and having a control input terminal responsive to said circuit means.

3. Apparatus according to claim 2 wherein said third pair of switching elements comprises a further pair of directional switching elements having the opposite directional characteristics of said first pair of switching elements and each having a control element responsive to said circuit means.

4. Apparatus according to claim 2 wherein said first pair of switching elements comprises a pair of PNP transistors.

5. Apparatus according to claim 3 wherein said second pair of switching elements comprises a pair of NPN transistors.

6. Apparatus according to claim 3 wherein said third pair of switching elements comprises a pair of NPN transistors.

7. Apparatus according to claim 1 wherein said circuit means comprise logic circuit means coupled with said switching elements and responsive to said two-bit binary logic signal for providing predetermined control signals, said first, second and third pairs of switching elements being responsive to said control signals.

8. Apparatus according to claim 1 wherein said first pair of switching elements, said second pair of switchin elements and said circuit means are all formed on an integrated circuit chip.

9. A DC motor control apparatus capable of controlling both rotational direction and dynamic braking of a DC motor, comprising: a plurality of switching elements coupled in a predetermined fashion with oppositely-poled ends of said DC motor and with a ground potential and a source of driving potential, and circuit means for actuating selected combinations of ones of said plurality of switching elements in response to different predetermined logic contents of a two-bit binary input signal for establishing different current paths through said DC motor to achieving driving of said DC motor in a forward direction and in a reverse direction and for releasing an excitation current in either direction from said DC motor to achieve dynamic braking thereof from rotation in either direction.

* * * * *